United States Patent
Kim et al.

(10) Patent No.: US 8,780,532 B2
(45) Date of Patent: Jul. 15, 2014

(54) CONDENSER ELEMENT, SOLID ELECTROLYTIC CAPACITOR AND METHOD FOR MANUFACTURING THE SAME

(75) Inventors: Jae Kwang Kim, Gyunggi-do (KR); Jun Suk Jung, Gyunggi-go (KR); Chang Sub Song, Gyunggi-do (KR)

(73) Assignee: Samsung Electro-Mechanics Co., Ltd., Suwon-Si, Gyunggi-Do (KR)

( * ) Notice: Subject to any disclaimer, the term of this patent is extended or adjusted under 35 U.S.C. 154(b) by 203 days.

(21) Appl. No.: 13/034,026

(22) Filed: Feb. 24, 2011

(65) Prior Publication Data

US 2012/0120554 A1 May 17, 2012

(30) Foreign Application Priority Data

Nov. 12, 2010 (KR) .................. 10-2010-0112461

(51) Int. Cl.
- H01G 9/04 (2006.01)
- H01G 5/013 (2006.01)
- H01G 9/00 (2006.01)
- H01G 4/228 (2006.01)

(52) U.S. Cl.
USPC .................. 361/528; 361/524; 361/540

(58) Field of Classification Search
USPC .................. 361/523, 528, 529, 524, 540
See application file for complete search history.

(56) References Cited

U.S. PATENT DOCUMENTS

| | | | |
|---|---|---|---|
| 4,942,501 A * | 7/1990 | MacFarlane et al. | 361/523 |
| 5,483,415 A * | 1/1996 | Nakamura et al. | 361/529 |
| 5,638,253 A * | 6/1997 | Hasegawa | 361/535 |
| 6,673,389 B1 | 1/2004 | Huntington | |
| 6,870,728 B1 * | 3/2005 | Burket et al. | 361/538 |
| 7,511,944 B2 * | 3/2009 | Kuriyama | 361/535 |
| 2004/0147666 A1 | 7/2004 | Tomihashi et al. | |
| 2004/0165338 A1 | 8/2004 | Arai et al. | |
| 2006/0164792 A1 | 7/2006 | Ando | |
| 2006/0262489 A1 * | 11/2006 | Vaisman et al. | 361/540 |
| 2008/0005878 A1 * | 1/2008 | Merker et al. | 29/25.03 |

(Continued)

FOREIGN PATENT DOCUMENTS

| | | |
|---|---|---|
| JP | 04-031686 | 11/1993 |
| JP | 2000-150305 A | 5/2000 |

(Continued)

OTHER PUBLICATIONS

Japanese Office Action, and English translation thereof, issued in Japanese Patent Application No. 2011-028532 dated Oct. 30, 2012.

(Continued)

*Primary Examiner* — David M Sinclair
(74) *Attorney, Agent, or Firm* — McDermott Will & Emery LLP (57) ABSTRACT

There is provided a solid electrolytic capacitor, including: a condenser element including a chip body molded by sintering, a positive electrode terminal contact layer formed on one area of the chip body to be exposed to the outside, an insulating layer formed in the entire area or some area other than one area in which the positive electrode terminal contact layer is formed, and a negative electrode layer stacked on the insulating layer; a negative electrode extracting layer stacked to be electrically connected with the negative electrode layer; a negative electrode terminal stacked on the negative electrode extracting layer; a positive electrode terminal stacked on the positive electrode terminal contact layer.

15 Claims, 8 Drawing Sheets

(56) References Cited

U.S. PATENT DOCUMENTS

| | | |
|---|---|---|
| 2008/0247122 A1 | 10/2008 | Vaisman et al. |
| 2010/0110615 A1 | 5/2010 | Nishimura et al. |
| 2011/0038102 A1* | 2/2011 | Kim et al. .................. 361/523 |
| 2011/0039093 A1 | 2/2011 | Fukumura |

FOREIGN PATENT DOCUMENTS

| | | | |
|---|---|---|---|
| JP | 2001274539 A | * | 10/2001 |
| JP | 2003-076167 A | | 3/2003 |
| JP | 2003-243263 A | | 8/2003 |
| JP | 2004-71634 | | 3/2004 |
| JP | 2004-253615 | | 9/2004 |
| JP | 2006319113 A | * | 11/2006 |
| JP | 2008-045140 A | | 2/2008 |
| JP | 2009-272100 A | | 11/2009 |
| JP | 2010-135750 A | | 6/2010 |
| KR | 10-2008-0108662 A | | 12/2008 |
| KR | 10-2009-0067792 A | | 6/2009 |
| WO | WO-2009/022400 A1 | | 2/2009 |

OTHER PUBLICATIONS

Korean Office Action issued in Korean Application No. 10-2010-0112461 mailed on Sep. 24, 2012.

Korean Office Action, and English translation thereof, issued in Korean Patent Application No. 10-2010-0112461 dated Mar. 7, 2013.

Korean Office Action, w/ English translation thereof, issued in Korean Patent Application No. KR 10-2010-0112461 dated Sep. 23, 2013.

Chinese Office Action issued in Chinese Application No. 201110064156.2 dated Feb. 28, 2014, w/English translation.

\* cited by examiner

CONDENSER ELEMENT, SOLID ELECTROLYTIC CAPACITOR AND METHOD FOR MANUFACTURING THE SAME

CROSS-REFERENCE TO RELATED APPLICATIONS

This application claims the priority of Korean Patent Application No. 10-2010-0112461 filed on Nov. 12, 2010, in the Korean Intellectual Property Office, the disclosure of which is incorporated herein by reference.

BACKGROUND OF THE INVENTION

1. Field of the Invention

The present invention relates to a condenser element, a solid electrolytic capacitor, and a method for manufacturing the same.

2. Description of the Related Art

Generally, a solid electrolytic capacitor is one of various electronic parts used to block DC current and pass AC current, in addition to storing electricity. As a representative solid electrolytic capacitor, there is a tantalum condenser contained therein.

The tantalum condenser has been used for general industrial instruments and application circuits operated in the range of a low rated voltage. In particular, the tantalum condenser has been frequently used to reduce noise from circuits or portable communication devices with a problem in frequency characteristics.

The above-mentioned solid electrolytic capacitor is manufactured by inserting a positive electrode wire into a central portion, or portions other than the central portion, of a condenser element made of tantalum and bending the inserted positive electrode wire at the outside of the condenser element.

That is, in order to electrically connect the positive electrode terminal to the condenser element, the positive electrode wire should be inserted and mounted in the central portion of the condenser element and the inserted positive electrode wire should be bent at the outside of the condenser element.

As a result, there is a problem, in that the solid electrolytic capacitor includes an area in which the volumetric efficiency of the positive electrode part is reduced due to the positive electrode wire. In other words, the solid electrolytic capacitor includes an inner space that is not used by the positive electrode wire, which causes a problem in reducing the volumetric efficiency of the positive electrode part.

In addition, since the positive electrode wire inserted into the condenser element is electrically connected to the positive electrode terminal, there is a limitation in improving electrical resistance characteristics, due to limitations in the thickness of the positive electrode wire. In other words, there is a problem in that electrical resistance characteristics are deteriorated due to the positive electrode wire.

SUMMARY OF THE INVENTION

An aspect of the present invention provides a condenser element capable of directly extracting a positive electrode terminal from a chip body without passing through a positive electrode wire, a solid electrolytic capacitor, and a method for manufacturing the same.

That is, an aspect of the present invention provides a condenser element, capable of improving the volumetric efficiency of a positive electrode part, a solid electrolytic capacitor, and a method for manufacturing the same as well as providing a condenser element capable of improving electrical resistance characteristics, a solid electrolytic capacitor, and a method for manufacturing the same.

Another aspect of the present invention provides a solid electrolytic capacitor capable of reducing damage to a positive electrode terminal and a negative electrode terminal from an external impact and a method for manufacturing the same.

Another aspect of the present invention provides a solid electrolytic capacitor capable of improving volumetric efficiency while reducing damage to a positive electrode terminal and a negative electrode terminal from an external impact and a method for manufacturing the same.

Another aspect of the present invention provides a solid electrolytic capacitor capable of increasing capacitance by expanding a surface area of a condenser element per unit volume while implementing low electrical resistance characteristics and a method for manufacturing the same.

According to an aspect of the present invention, there is provided a condenser element, including: a chip body molded by sintering; and a positive electrode terminal contact layer formed on one area of the chip body to be exposed to the outside.

The positive electrode terminal contact layer may be formed in one area of the chip body and may be made of a resin material.

The resin included in the positive electrode terminal contact layer may be made of a thermosetting material so as to have heat resistance, corrosion resistance, and mechanical strength.

The resin included in the positive electrode terminal contact layer may be made of nano particles so as to be easily infiltrated into the chip body.

The condenser element may further include: an insulating layer formed in the entire area or some area other than one area in which the positive electrode terminal contact layer is formed and formed by growing an oxide film; a negative electrode layer stacked on the insulating layer and configured of a manganese dioxide layer; a carbon layer stacked on the negative electrode layer; and a silver paste layer stacked on the carbon layer to improve conductivity.

According to another aspect of the present invention, there is provided a solid electrolytic capacitor, including: a condenser element including a chip body molded by sintering, a positive electrode terminal contact layer formed on one area of the chip body to be exposed to the outside, an insulating layer formed in the entire area or some area other than one area in which the positive electrode terminal contact layer is formed, and a negative electrode layer stacked on the insulating layer; a negative electrode extracting layer stacked to be electrically connected with the negative electrode layer; a negative electrode terminal stacked on the negative electrode extracting layer; and a positive electrode terminal stacked on the positive electrode terminal contact layer.

The solid electrolytic capacitor may further include: strength reinforcing members mounted to be interposed between the negative electrode terminal and the condenser element and between the positive electrode terminal and the condenser element to prevent the negative electrode terminal and the positive electrode terminal from being damaged due to an external impact and a liquid sealing material sealing the bottom surface of the condenser element by being filled between the strength reinforcing members.

The solid electrolytic capacitor may further include a molding layer stacked on a portion other than the positive electrode terminal contact layer and the negative electrode extracting layer to protect the condenser element.

The negative electrode extracting layer may be formed as a dispensing type, a dipping type, or a printing type.

The negative electrode extracting layer may be made of a paste having viscosity including a conductive material.

The negative electrode extracting layer may be made of a conductive paste having viscosity including at least one of Au, Pd, Ag, Ni, and Cu.

The strength reinforcing member may be made of a metallic material or a synthetic resin material.

The strength reinforcing member may be made of a material including a metallic material of at least one of steel, Cu, and Ni.

The strength reinforcing member may be formed to have a thickness of 20 to 50 μm.

The liquid sealing member may be interposed between the bottom surface of the condenser element and the top surface of the strength reinforcing member to insulate the condenser element from the strength reinforcing member.

The liquid sealing member may contact at least two surfaces of the strength reinforcing member to improve the bonding strength of the strength reinforcing member.

The negative electrode terminal and the positive electrode terminal may be formed by any one of an electrolysis plating method, an electroless plating method, a dipping method, and a paste applying method.

The solid electrolytic capacitor may further include an inner plating layer made of electroless nickel-phosphorus (Ni—P) and an outer plating layer formed by plating copper (Cu) or tin (Sn) on the inner plating layer when the negative electrode terminal and the positive electrode terminal are formed by the electroless plating method.

The negative electrode terminal and the positive electrode terminal may be formed to be extended to the bottom surface of the positive electrode terminal contact layer, the negative electrode extracting layer, and the strength reinforcing member adjacent to the positive electrode terminal contact layer and the negative electrode extracting layer.

The condenser element may be provided in plural to be arranged in parallel.

The plurality of condenser elements may be parallely arranged in a vertical direction or a horizontal direction.

According to another aspect of the present invention, there is provided a method for manufacturing a solid electrolytic capacitor, including: molding a porous chip body by sintering; and impregnating one end portion of the chip body in an impregnant including a resin material.

The resin included in the impregnant may be made of a thermosetting material to provide heat resistance, corrosion resistance, and mechanical strength.

The resin included in the impregnant may be made of nano particles so as to be easily infiltrated into the chip body.

The method for manufacturing a solid electrolytic capacitor may further include: after the impregnating of the one end portion of the chip body in the impregnant, forming an insulating layer by growing an oxide film in the entire area or some area other than the one end portion of the chip body; stacking a negative electrode layer on the insulating layer; stacking a carbon layer on the negative electrode layer; and stacking a silver paste layer on the carbon layer to improve conductivity.

The method for manufacturing a solid electrolytic capacitor may further include: prior to the molding of the chip body, forming a strength reinforcing member on amounting sheet configured of a synthetic resin film; and applying a liquid sealing material on the top surfaces of the mounting sheet and the strength reinforcing member.

The method for manufacturing a solid electrolytic capacitor may further include: after the stacking of the silver paste layer, mounting the chip body stacked with the silver paste layer on the mounting sheet to which the liquid sealing material is applied; stacking a negative electrode extracting layer on the other end portion of the chip body stacked with the silver paste layer; stacking a molding layer by molding to dispose the chip body stacked with the negative electrode extracting layer therein; and exposing the one end portion of the chip body and the negative electrode extracting layer to the outside through a dicing process.

The method for manufacturing a solid electrolytic capacitor may further include: after the dicing, forming the positive electrode terminal and the negative electrode terminal on the one end portion of the chip body and the negative electrode extracting layer, respectively.

The method for manufacturing a solid electrolytic capacitor may further include: after the dicing, removing the mounting sheet from the bottom surface of the strength reinforcing member.

The method for manufacturing a solid electrolytic capacitor may further include: after the dicing, grinding or trimming a diced surface in order to remove impurities included in the diced surface.

The stacking of the negative electrode extracting layer may be made by any one of a dispensing method, a dipping method, and a printing method.

The strength reinforcing member may be formed by machining a pattern using etching or that is formed by machining the pattern using electroless or electrolysis plating.

The positive electrode terminal and the negative electrode terminal may be formed by any one of an electrolysis plating method, an electroless plating method, a dipping method, and a paste applying method.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, and those are to be construed as being included in the spirit of the present invention.

Further, when it is determined that the detailed description of the known art related to the present invention may obscure the gist of the present invention, a detailed description thereof will be omitted.

Figure 1:
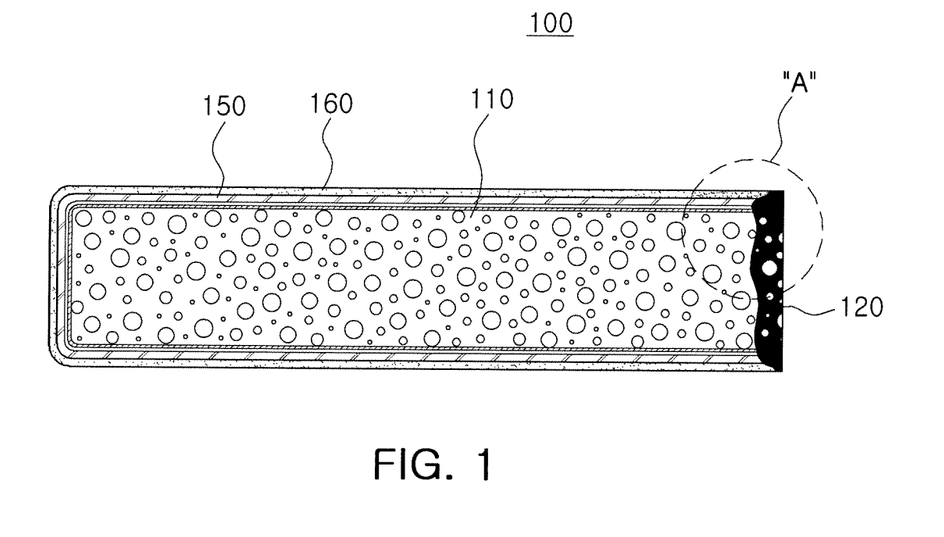
FIG. 1 is a longitudinal cross-sectional view showing a condenser element according to an exemplary embodiment of the present invention.
Figure 2:
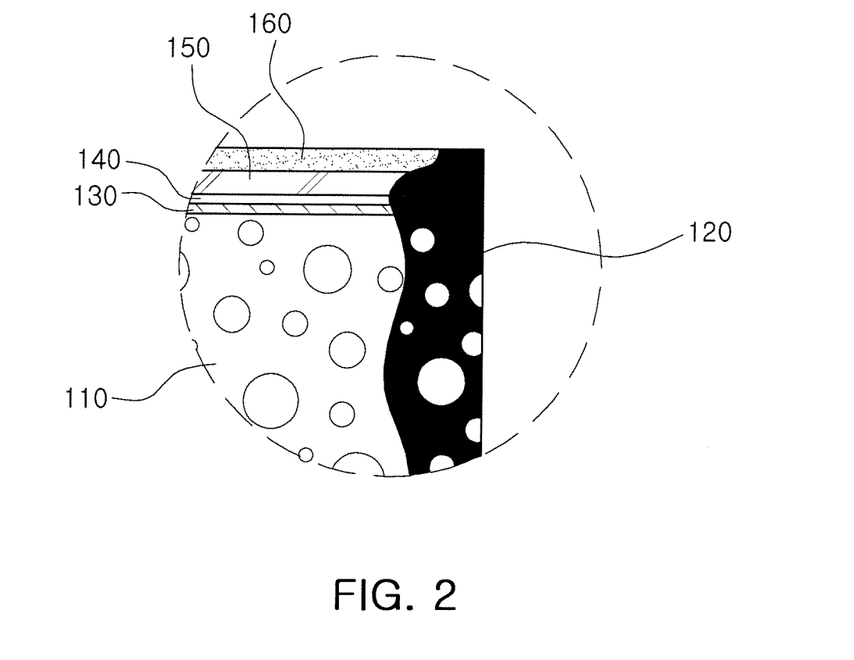
FIG. 2 is an enlarged view showing part A of FIG. 1.

FIG. 1 is a longitudinal cross-sectional view showing a condenser element according to an exemplary embodiment of the present invention and FIG. 2 is an enlarged view showing part A of FIG. 1.

Referring to FIGS. 1 and 2, a condenser element 100 according to an exemplary embodiment of the present invention may be configured to include a chip body 110 and a positive electrode terminal contact layer 120.

The chip body 110 is molded by sintering. That is, the chip body 110 may be manufactured by sintering using a material such as tantalum, niobium (NB) oxide, or the like. The case in which the chip body 110 is manufactured by using the tantalum material will be described by way of example. The chip body 110 is manufactured by mixing a tantalum powder with a binder at a predetermined ratio and agitating it, compressing the mixed powder to mold it into a rectangular parallelepiped shape, and then, sintering it under conditions of high temperature and high vibrations.

The positive electrode terminal contact layer 120 is formed in one area of the chip body 110 so that the chip body 110 is exposed to the outside. Further, the positive electrode terminal contact layer 120 may be configured to include a resin material, wherein one end portion of the chip body 110 is impregnated in an impregnant made of a resin material to impregnate the resin in the one end portion of the chip body 110 and then, one area of the chip body 110, in which the resin is impregnated, is cut to expose the chip body 110 to the outside, thereby making it possible to form the positive electrode terminal contact layer 120.

Further, the resin included in the positive electrode contact layer 120 may be made of a thermosetting material in order to have heat resistance, corrosion resistance, and mechanical strength. In addition, the resin included in the positive electrode terminal contact layer 120 may be made of nano particles so as to be easily infiltrated into the chip body 110.

Meanwhile, the condenser element 100 according to an exemplary embodiment of the present invention may be configured to further include an insulating layer 130, a negative electrode layer 140, a carbon layer 150, and a silver paste layer 160.

The insulating layer 130 is formed in the entire area or some area other than one area in which the positive electrode terminal contact layer 120 is formed. The insulating layer 130 may be formed by growing an oxide film. That is, the insulating layer 130 may be formed by growing an oxide layer Ta2O5 on the surface of the chip body 110 by a formation process using electrochemical reaction. In this case, the insulating layer 130 changes the chip body 110 into a dielectric.

The negative electrode layer 140 is stacked on the insulating layer 130 and may be made of manganese dioxide MnO2.

That is, the negative electrode layer 140, which is a manganese dioxide (MnO2) layer having a negative electrode, may be formed by impregnating the chip body 110 formed with the insulating layer 130 in a manganese nitrate solution to be applied the manganese nitrate solution to the outer surface thereof and firing it.

The carbon layer 150 may be stacked on the negative electrode layer 140 and the silver paste layer 160 may be stacked on the carbon layer 150 in order to improve conductivity. That is, the carbon layer 150 and the silver paste layer 160 may be stacked by being sequentially applied to the negative electrode layer 140. In addition, the carbon layer 150 and the silver paste layer 160 facilitate the electrical connection for polarity transfer by improving the conductivity for polarity of the negative electrode layer 140.

As described above, the positive electrode wire may not be mounted on the chip body 110 through the positive electrode contact layer 120, thereby making it possible to improve electrical resistance characteristics. That is, the deterioration in the electrical resistance characteristics due to the positive electrode wire can be reduced and the capacitance can be increased by removing the positive electrode wire.

In other words, in order to secure the electrical resistance characteristics of the condenser element, the thick positive electrode wire is mounted on the chip body 110, such that the thick positive electrode wire reduces electrical resistance characteristics. As described above, the positive electrode wire may not be mounted on the chip body 110 through the positive electrode contact layer 120, thereby making it possible to improve the electrical resistance characteristics.

In addition, the positive electrode terminal contact layer 120 is formed by using the entire area of one side of the chip body 110, such that the electrical resistance characteristics may be further improved.

Further, the positive electrode wire is removed, such that the chip body 110 is formed in a space occupied by the positive electrode wire, thereby making it possible to increase capacitance.

Hereinafter, the solid electrolytic capacitor according to an exemplary embodiment of the present invention will be described with reference to the drawings. However, the condenser element is already described and therefore, the detailed description thereof will be omitted.

Figure 3:
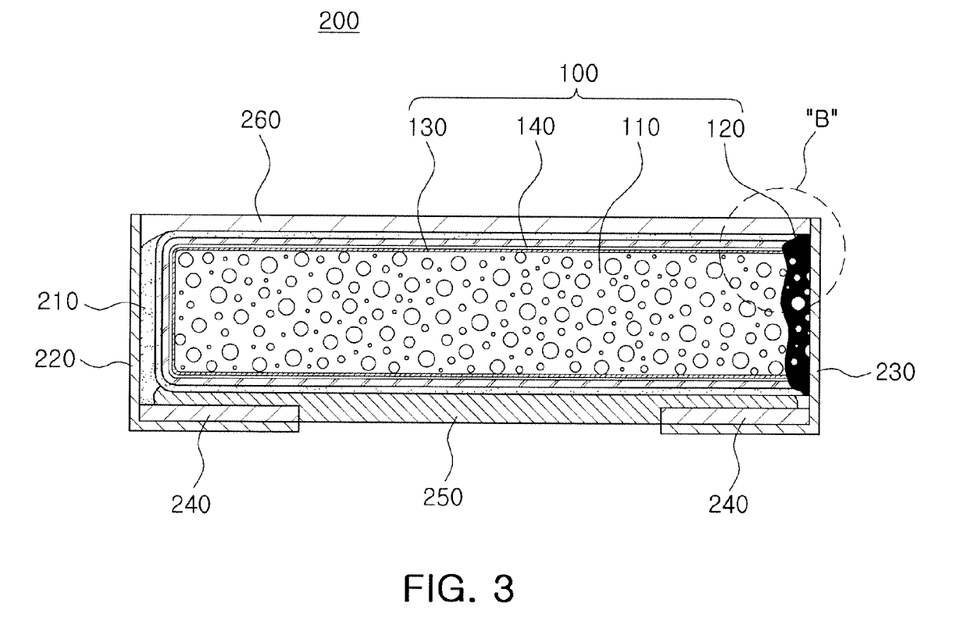
FIG. 3 is a longitudinal cross-sectional view showing a solid electrolytic capacitor according to an exemplary embodiment of the present invention.
Figure 4:
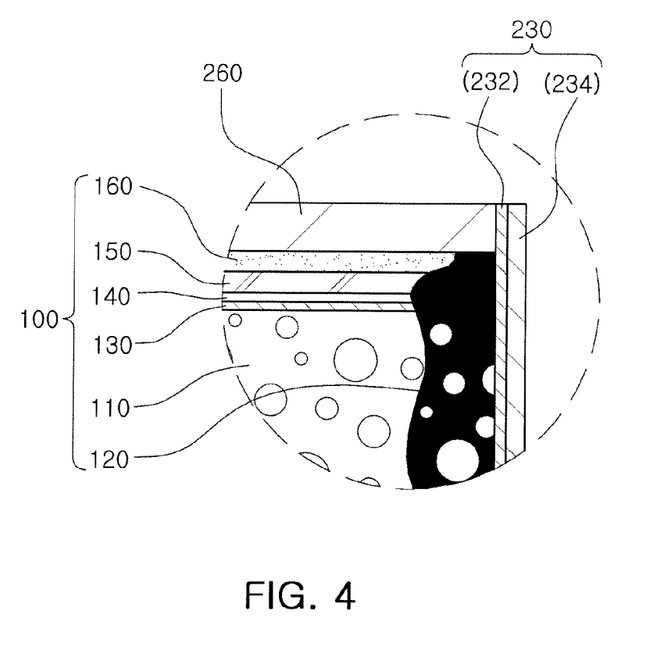
FIG. 4 is an enlarged view showing B part of FIG. 3.
Figure 5:
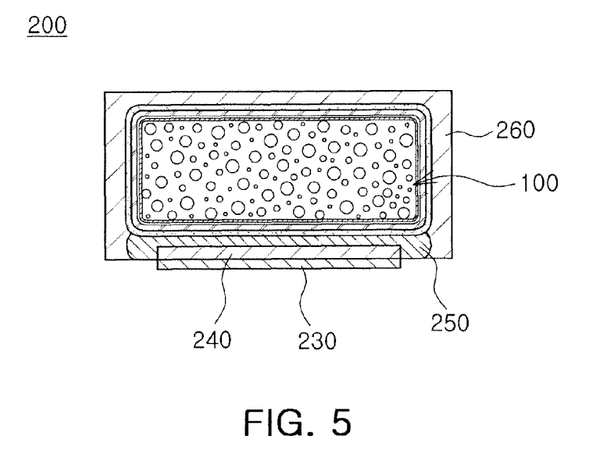
FIG. 5 is a transversal cross-sectional view showing a solid electrolytic capacitor according to an exemplary embodiment of the present invention.

FIG. 3 is a longitudinal cross-sectional view showing a solid electrolytic capacitor according to an exemplary embodiment of the present invention, FIG. 4 is an enlarged view showing B part of FIG. 3, and FIG. 5 is a transversal cross-sectional view showing a solid electrolytic capacitor according to an exemplary embodiment of the present invention.

Referring to FIGS. 3 to 5, the solid electrolytic capacitor 200 according to the exemplary embodiment of the present invention may be configured to include the condenser element 100, a negative electrode extracting layer 210, a negative electrode terminal 220, and a positive electrode terminal 230.

The condenser element 100 is configured to include the chip body 110 molded by sintering, the positive electrode terminal contact layer 120 formed in one area of the chip body 110 to expose the chip body 110 to the outside, the insulating layer 130 formed in the entire area or some area other than one area in which the positive electrode terminal contact layer 120, and a negative electrode layer 140 stacked on the insulating layer 130.

The negative electrode extracting layer 210 and the negative electrode layer 140 are stacked to be electrically connected to each other. That is, the negative electrode extracting layer 210 is formed at an end side of an opposite side on which the positive electrode terminal contact layer 120 is formed and is stably bonded to the negative electrode terminal 220 to extract the negative electrode terminal 220.

In addition, the negative electrode extracting layer 210 may be made of a conductive paste made of gold (Au), lead (Pb), silver (Ag), nickel (Ni), copper (Cu), or the like, having viscosity, and which is applied to one surface of the condenser element 100 in order to have sufficient strength and hardness from the drying, hardening, and sintering processes.

Meanwhile, the negative electrode extracting layer 210 may be hardened at a temperature of between approximately 23 and 300° C.

In addition, the negative electrode extracting layer 210 may be formed on one surface of the condenser element 100 by a dispensing method, a dipping method to attach a predetermined amount of paste to one surface thereof, or a printing method to print paste on a sheet and attach it to one surface of the condenser element 100, or the like.

The negative electrode terminal 220 is stacked on the negative electrode extracting layer 210 and the positive electrode terminal 230 is stacked on the positive electrode terminal contact layer 120. Meanwhile, the negative electrode terminal 220 and the positive electrode terminal 230 are formed at both sides of the condenser element 100. In addition, the solid electrolytic capacitor 200 is surface-mounted (SMT) electronic parts, such that it may be formed to be extended to the bottom surface from both sides of the condenser element 110.

Meanwhile, the negative electrode terminal 220 and the positive electrode terminal 230 may be formed by any one of an electrolysis plating method, an electroless plating method, a dipping method, and a paste applying method.

When the negative electrode terminal 220 and the positive electrode terminal 230 are formed by the electroless plating method, they may be configured of an inner plating layer 232 (not shown) made of electroless nickel/phosphorus (Ni/P) and an outer plating layer 234 (not shown) formed by plating copper (Cu) or tin (Sn) into the inner plating layer.

Meanwhile, the solid electrolytic capacitor 200 according to the exemplary embodiment of the present invention may be configured to further include a strength reinforcing member 240 and a liquid sealing material 250.

The strength reinforcing member 240 is mounted to be interposed between the negative electrode terminal 220 and the condenser element 100 and between the positive electrode terminal 230 and the condenser element 100, thereby preventing the negative electrode terminal 220 and the positive electrode terminal 230 from being damaged due to external impact.

That is, the strength reinforcing member 240 is provided at both sides of the bottom surface of the condenser element 100.

Meanwhile, the solid electrolytic capacitor 200 according to the exemplary embodiment of the present invention is frequently mounted in an inspection apparatus to inspect the voltage application and characteristics during the manufacturing process. When a probe of the inspection apparatus contacts the negative electrode terminal 220 and the positive electrode terminal 230, the impact is buffered by the strength reinforcing member 240 attached to a portion in which the terminals are formed, thereby making it possible to prevent the negative electrode terminal 220 and the positive electrode terminal 230 from being floated or damaged.

Further, the strength reinforcing member 240 may be made of a metallic material, a synthetic resin material, or ceramic having a predetermined strength. In the case of the metallic material, the strength reinforcing member 240 may be made of a conductive material such as steel, copper (Cu), nickel (Ni), or the like.

The strength reinforcing member 240 may be formed at a thickness within about 100 µm and may be formed to have a thickness of 20 to 50 µm to allow the condenser element 100 bonded to the strength reinforcing member 240 to have the optimal volumetric efficiency within a limited space.

Meanwhile, the strength reinforcing member 240 may be attached to the bottom surface of the condenser element 100 by the liquid sealing material 250.

The liquid sealing material 250 is filled between the strength reinforcing members 240 to seal the bottom surface of the condenser element 100. The liquid sealing material 250 serves to firmly bond the strength reinforcing member 240 by being interposed between the bonding surfaces of the condenser element 100 and the strength reinforcing member 240, while protecting the condenser element 100 by surrounding the bottom surface of the condenser element 100.

In addition, the liquid sealing material 250 is made of an insulating material to insulate the strength reinforcing member 240 made of a conductive material, the strength reinforcing member 240 being attached to a portion in which the negative electrode terminal 220 and the positive electrode terminal 230 is formed, thereby making it possible to prevent short-circuiting.

In addition, the liquid sealing material may include a predetermined amount of a releasing agent. In this case, the bonding strength between the condenser element 100 and the strength reinforcing member 240 may be weakened, such that the releasing agent may not be included in the liquid sealing material 250 in the exemplary embodiment.

Meanwhile, the liquid sealing material 250 may be made of an epoxy resin material having a predetermined amount of filler. In addition, the liquid sealing material 250 may include 50 to 90% of filler and the filler included in the liquid sealing material 250 may have a size of 20 to 30 µm. Therefore, this can fill the lower side of the condenser element 100 with the liquid sealing material 250, which can reduce the molding defects due to the non-filling of the liquid sealing material 250.

In addition, the liquid sealing member 250 contacts at least two surfaces of the strength reinforcing member 240, thereby making it possible to improve the bonding strength of the strength reinforcing member 240.

The solid electrolytic capacitor 200 according to the exemplary embodiment of the present invention is stacked on a portion other than the positive electrode terminal contact layer 120 and the negative electrode extracting layer 210 and may be configured to further include the molding layer 260 protecting the condenser element 100.

That is, the molding layer 260 is entirely formed at the outside of the condenser element 100. In other words, the molding layer 260 surrounds a portion other than the positive electrode terminal contact layer 120 exposed to both side portions of the condenser element 100 and the lower portions of the negative electrode extracting layer 210 and the condenser element 100, thereby protecting the condenser element 100 from external environment.

Meanwhile, the molding layer 260 may be made of an epoxy material. The molding layer 260 may be made of an epoxy material including 60 to 90% of filler having a size of 50 to 100 µm.

As described above, the positive electrode wire is removed through the positive electrode terminal contact layer 120, thereby making it possible to directly extract the positive electrode terminal 230 from the chip body 110.

Therefore, the present invention can improve the volumetric efficiency of the positive electrode part while improving the electrical resistance characteristics.

In addition, the present invention can reduce the damage of the positive electrode terminal 230 and the negative electrode terminal 220 from the external impact by using the strength reinforcing member 240.

The damage of the positive electrode terminal 230 and the negative electrode terminal 220 can be prevented by using the strength reinforcing member 240, thereby making it possible to improve the volumetric efficiency.

Hereinafter, a solid electrolytic capacitor according to another exemplary embodiment of the present invention will be described with reference to the drawings. However, the same components as the foregoing components are already described and therefore, the detailed description thereof will be omitted.

Figure 6:
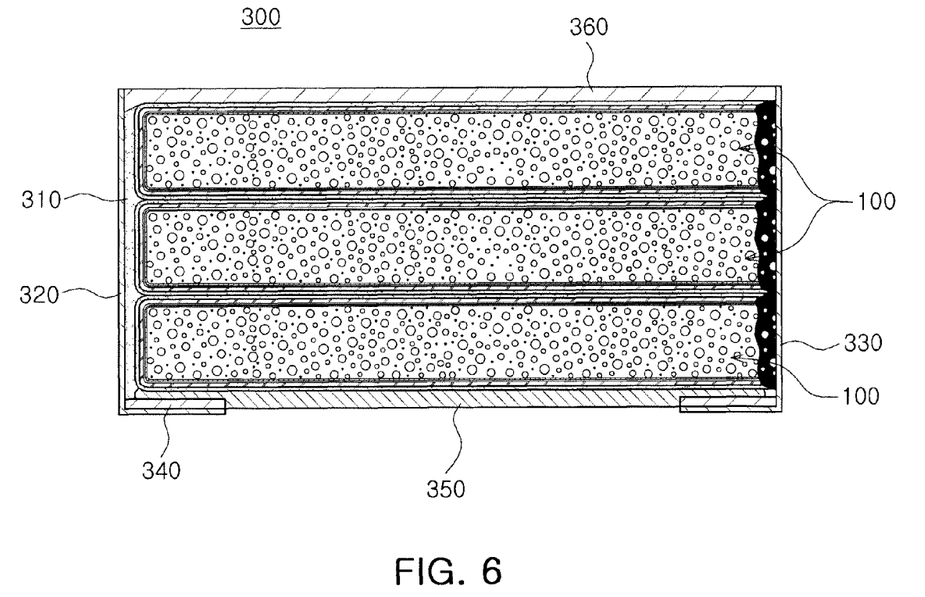
FIG. 6 is a longitudinal cross-sectional view showing a solid electrolytic capacitor according to another exemplary embodiment of the present invention.

FIG. 6 is a longitudinal cross-sectional view showing a solid electrolytic capacitor 300 according to another exemplary embodiment of the present invention.

Referring to FIG. 6, the solid electrolytic capacitor 300 according to another exemplary embodiment of the present invention may be configured to include the plurality of condenser elements 100, a negative electrode extracting layer 310, a negative electrode terminal 320, a positive electrode terminal 330, a strength reinforcing member 340, a liquid sealing material 350, and a molding layer 360.

Meanwhile, the solid electrolytic capacitor 300 according to another exemplary embodiment of the present invention has a difference in the number of condenser elements included in the solid electrolytic capacitor 200 according to the exemplary embodiment of the present invention and the remaining components are the same as the exemplary embodiment.

Therefore, only the differences therebetween will be described below and the detailed description of the remaining components will be substituted into the description of the solid electrolytic capacitor 200 according to the exemplary embodiment of the present invention.

Meanwhile, the solid electrolytic capacitor 300 is formed by arranging the condenser elements 100 in parallel, which can improve the impregnation of the condenser element 100 to increase capacity and implement the low electrical resistance characteristics.

In other words, the solid electrolytic capacitor 300 expands the surface area of the condenser element 100 per unit volume by connecting the plurality of relatively thin condenser elements 100 in parallel, thereby making it possible to increase the capacitance thereof.

Described in more detail, the size of the chip body configuring the condenser element is increased in the case of the single condenser element having the same volume as the plurality of condenser elements 100, such that it is difficult to infiltrate the impregnant up to the central portion of the chip body, while as the thickness of the chip body is thin, it is easy to infiltrate the impregnant up to the central portion of the chip body. Therefore, as the thickness of the chip body is maintained thinly, it is easy to maintain the low electrical resistance characteristics by improving the impregnation.

Therefore, as shown in FIG. 6, the plurality of condenser elements 100 having a relatively thin thickness are arranged in parallel and the negative electrode terminal 320 and the positive electrode terminal 330 are connected to both sides of each condenser element 100.

Hereinafter, the solid electrolytic capacitor according to the exemplary embodiment of the present invention will be described with reference to the drawings.

Meanwhile, the same components as the foregoing components will be described using reference numerals already used.

FIGS. 7 to 16 are process flow diagrams for explaining a method for manufacturing a solid electrolytic capacitor according to an exemplary embodiment of the present invention.

Figure 7:
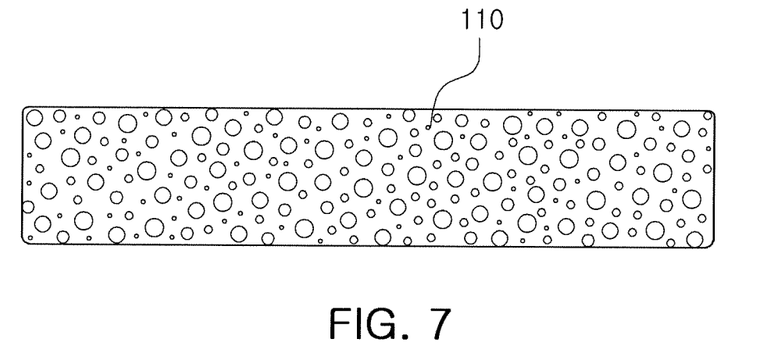
FIGS. 7 to 16 are process flow diagrams for explaining a method for manufacturing a solid electrolytic capacitor according to an exemplary embodiment of the present invention.

A method for manufacturing a solid electrolytic capacitor 200 according to an exemplary embodiment of the present invention may be configured to include molding a porous chip body 110 by sintering and impregnating one end portion of the chip body 110 in the impregnant including a resin material.

The chip body 110, shown in FIG. 7, is molded by mixing a powder made of a material such as tantalum or niobium (Nb) oxides with a binder at a predetermined ratio and agitating it, compressing the mixed powder to mold it into a rectangular parallelepiped shape, and then, sintering it under conditions of high temperature and high vibrations.

Figure 8:
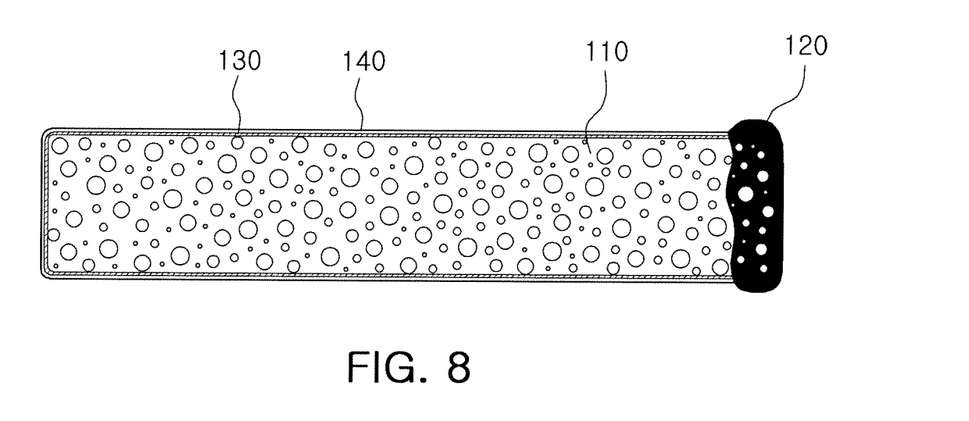

Thereafter, the one end portion of the chip body 110 is impregnated in the impregnant including a resin material. Therefore, the resin is impregnated in the one end portion of the chip body 110 as shown in FIG. 8.

Further, the resin impregnated (the chip body 110 being infiltrated with and dipped therein) into the one end portion of the chip body 110 may be provide heat resistance, corrosion resistance, and mechanical strength and may be made of nano particles to be more easily impregnated through the fine pores of the chip body 110.

Therefore, the one end portion of the chip body 110 is protected from drug used to extract the negative electrode, thereby making it possible to prevent the short circuit and the positive electrode may be stably extracted from the one end portion of the chip body 110.

Figure 9:
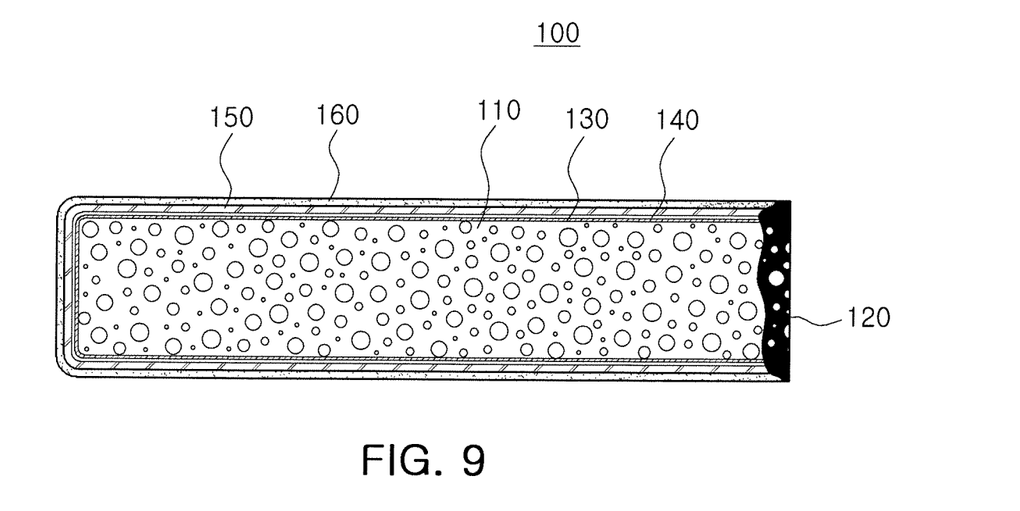

Further, the method for manufacturing a solid electrolytic capacitor 200 according to the exemplary embodiment of the present invention may be configured to further include growing an oxide film in the entire area or some area other than the one end portion of the chip body 110 to form the insulating layer 130, stacking the negative electrode layer 140 on the insulating layer 130, stacking the carbon layer 150 on the negative electrode layer 140, and stacking the silver paste layer 160 on the carbon layer 150 to improve the conductivity.

In other words, the insulating layer 130 is formed by growing the oxide film in the entire area or some area other than the one end portion of the chip body 110 after the process of impregnating the one end portion of the chip body 110 in the impregnant to form the insulating layer 130 as shown in FIG. 8.

The insulating layer 130 is configured of a dielectric oxide film layer and is insulated from the negative electrode layer 140. That is, the insulating layer 130 changes the chip body 110 into a dielectric. In addition, the insulating layer 130 may be formed by growing an oxide layer Ta2O5 on the surface of the chip body 110 by a formation process using electrochemical reaction.

Then, the negative electrode layer 140 is stacked on the insulating layer 130 as shown in FIG. 8. The negative electrode layer 140, which is a manganese dioxide (MnO2) layer having a negative electrode, may be formed by impregnating the chip body 110 formed with the insulating layer 130 in a manganese nitrate solution to be applied the manganese nitrate solution to the outer surface thereof and firing it.

Thereafter, the carbon layer 150 is stacked on the negative electrode layer 140 and when the stacking of the carbon layer 150 is completed, the silver paste layer 160 is stacked. That is, as shown in FIG. 9, the carbon layer 150 and the silver paste layer 160 may be stacked by being sequentially applied to the negative electrode layer 140.

In addition, the carbon layer 150 and the silver paste layer 160 facilitate the electrical connection for polarity transfer by improving the conductivity for polarity of the negative electrode layer 140.

Meanwhile, since the resin is impregnated in the one end portion of the chip body 110, the insulating layer 130, the negative electrode layer 140, the carbon layer 150, and the silver paste layer 160 cannot be stacked on the one end portion of the chip body 110 when the insulating layer 130, the negative electrode layer 140, the carbon layer 150, and the silver paste layer 160 are stacked.

The condenser element 100 according to the exemplary embodiment of the present invention is manufactured through the above-mentioned process.

Figure 10:
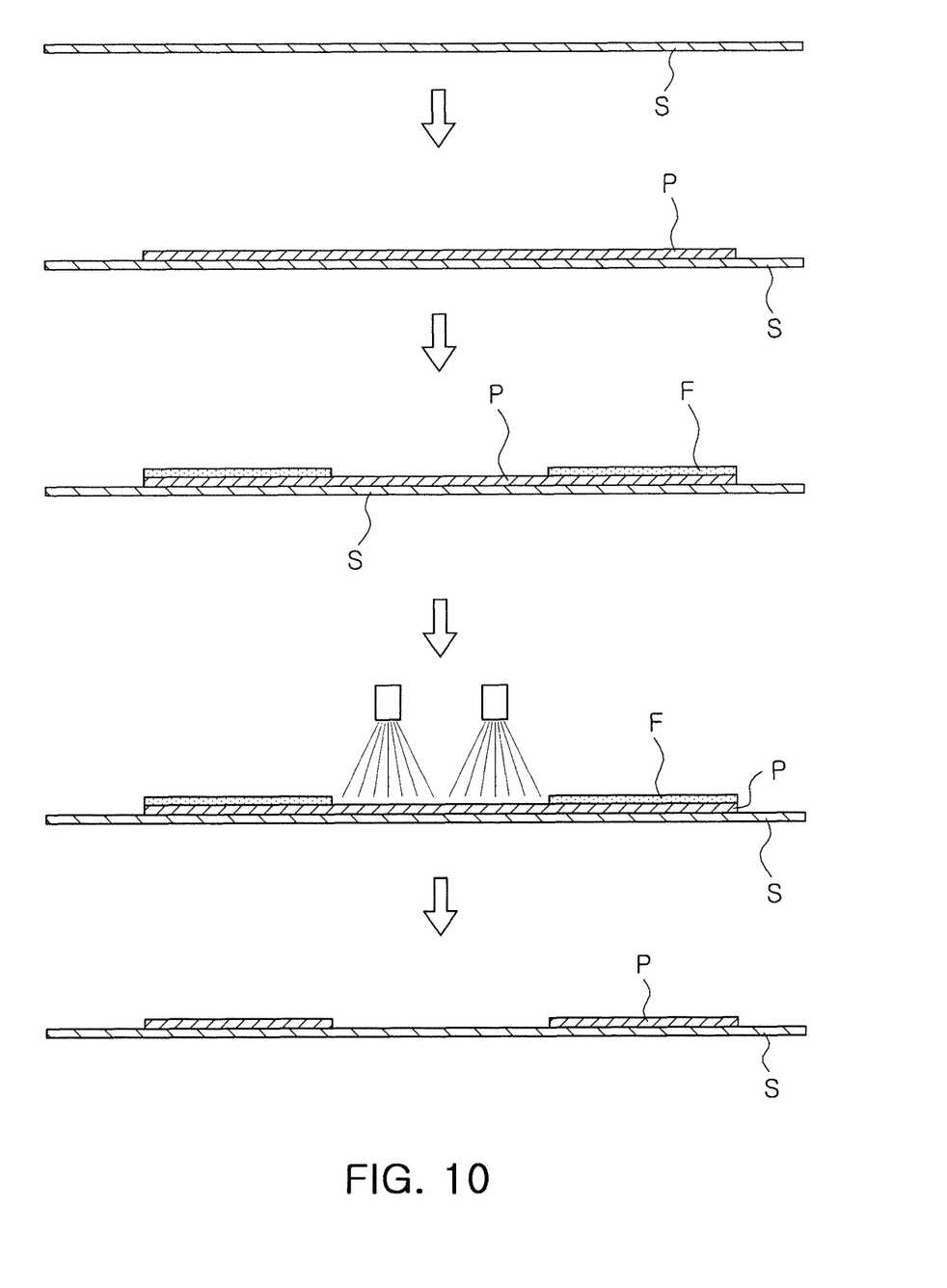

In addition, the method for manufacturing the solid electrolytic capacitor 200 according to the exemplary embodiment of the present invention may be configured to further include forming the strength reinforcing member 240 on a mounting sheet S configured of a synthetic resin film before the process of molding the chip body 110 and applying the liquid sealing material 250 to the top surface of the mounting sheet S and the strength reinforcing member 240.

Figure 11:
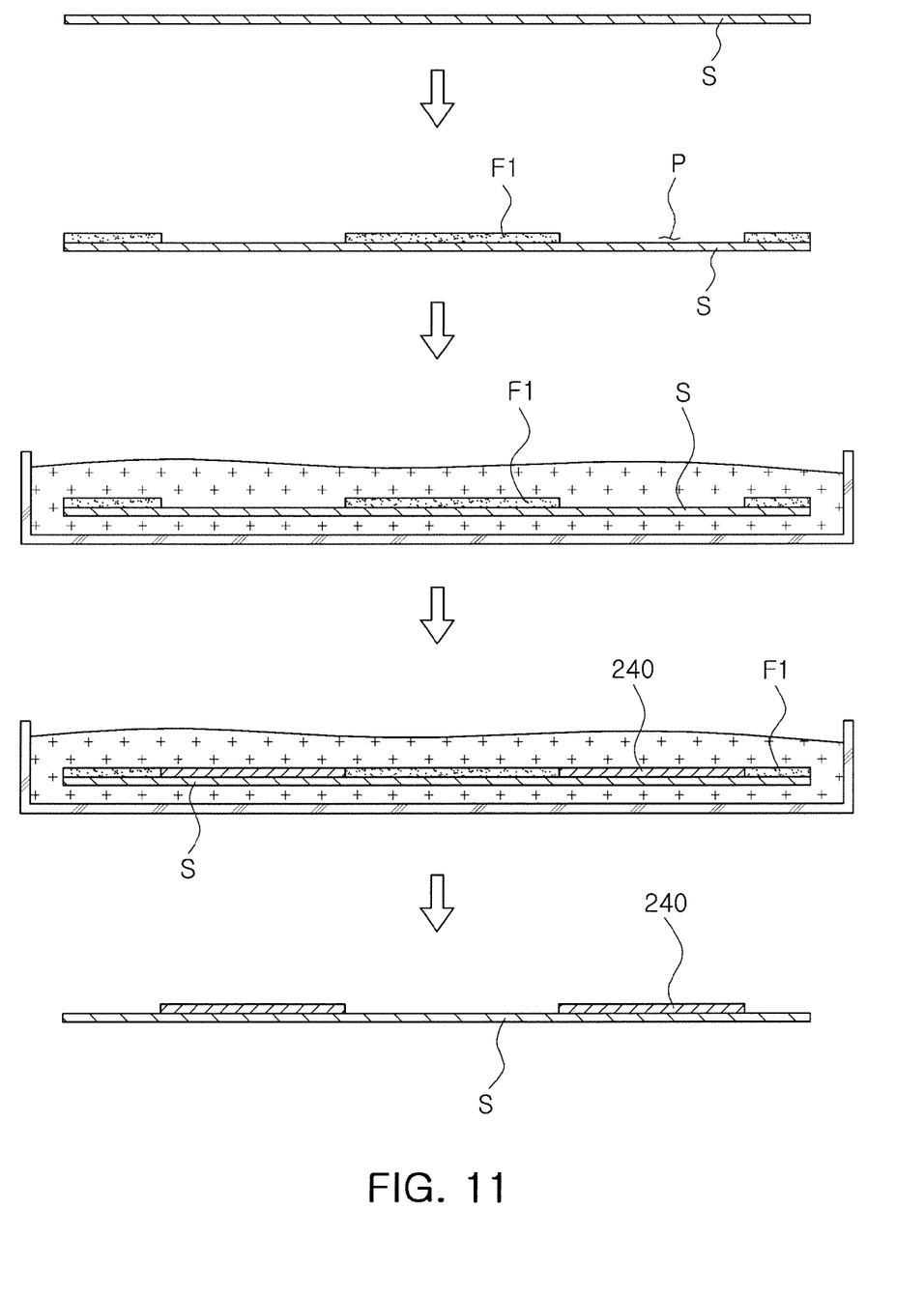

Meanwhile, the strength reinforcing member 240 is formed on the mounting sheet S configured of the synthetic resin film. In this case, the strength reinforcing member 240 may be formed by machining a pattern using an etching or may be formed by machining a pattern using the electroless or electrolysis plating.

First, reviewing the case in which the strength reinforcing member 240 is formed by machining the pattern using the etching shown in FIG. 10, a conductive foil F made of copper (Cu), nickel (Ni), or the like is bonded to the mounting sheet S configured of the synthetic resin film at a thickness of about 150 μm or less in order to form the strength reinforcing member 240.

Next, the pattern machining is performed by attaching a mask pattern P having a film type to the top surface of the conductive foil F uniformly applied to the mounting sheet S, i.e., the position in which the strength reinforcing member 240 will be formed and etching the conductive foil F.

When the pattern machining is completed, the manufacturing of the mounting sheet S on which a pair of strength reinforcing members 240 is formed is completed by removing the mask pattern P on the top surface of the conductive foil F.

Describing the case in which the strength reinforcing member 240 is formed by machining the pattern using the electroless plating or the electrolysis plating shown in FIG. 11, the bonding film F1 having the same thickness as the plating thickness is bonded to the mounting sheet S configured of the synthetic resin film and the pattern P is formed at the plating portion.

Next, the copper (Cu) or nickel (Ni) plating layer is grown on the portion in which the pattern is formed by immersing the film formed with the pattern P in a plating bath and performing the electroless plating or the electrolysis plating.

When the plating is completed at the portion in which the pattern is formed, the manufacturing of the mounting sheet S on which the pair of strength reinforcing member 240 is formed is completed by removing the bonding film F1 from the portion other than the portion in which the pattern is formed.

Figure 12:
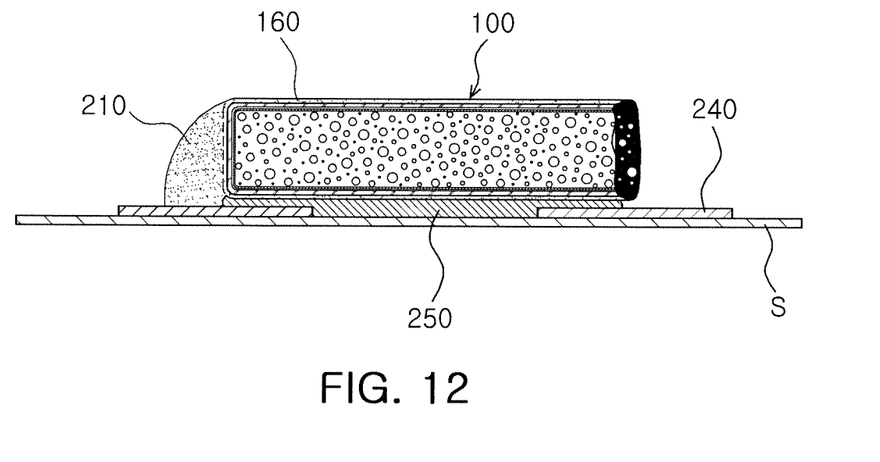
Figure 13:
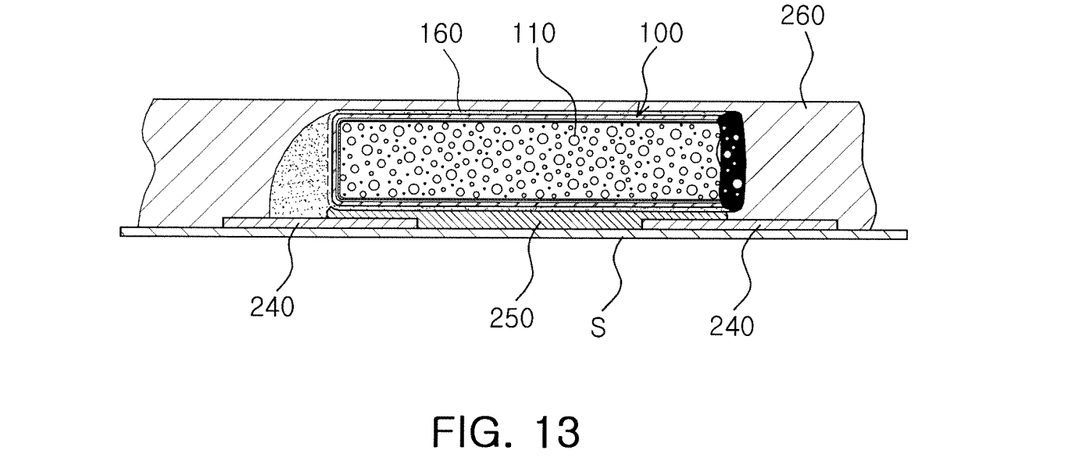
Figure 14:
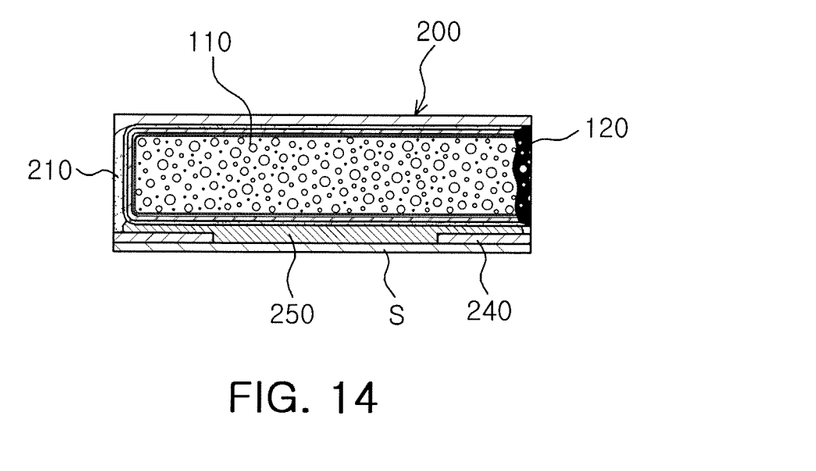

The method for manufacturing a solid electrolytic capacitor 200 according to the exemplary embodiment of the present invention may be configured to further include mounting the chip body 110 stacked with the silver paste layer 160 on the mounting sheet S to which the liquid sealing material 250 is applied after the process of stacking the silver paste layer 160, stacking the negative electrode extracting layer 210 on the other end portion of the chip body 110 in which the silver paste layer 160 is stacked, forming the molding layer 260 by the molding to dispose the chip body 110 stacked with the negative electrode extracting layer 210 therein, and exposing the one end portion of the chip body and the negative electrode extracting layer to the outside through a dicing process.

When the strength reinforcing member 240 is formed on the mounting sheet S, the liquid sealing material 250 is applied to the top surface S of the mounting sheet S and the strength reinforcing member 240 as shown in FIG. 12.

In this case, the liquid sealing member 250 contacts at least two surfaces of the strength reinforcing member 240, thereby making it possible to improve the bonding strength of the strength reinforcing member 240.

Thereafter, the chip body 110 in which the silver paste layer 160 is stacked is mounted on the mounting sheet S to which the liquid sealing material 250 is applied. That is, the condenser element 100 is mounted on the mounting sheet S in which the liquid sealing material 250 is applied up to the upper portion of the strength reinforcing member 240.

In this case, the bottom surfaces of both side portions of the condenser element 100 are seated on the top surface of the strength reinforcing member 240 to be firmly bonded to each other by the liquid sealing material 250 disposed on the bottom surfaces of the strength reinforcing member 240 and the condenser element 100 and the bottom surface of the condenser element 100 is protected by the liquid sealing material 250 applied to the mounting sheet S.

Thereafter, the negative electrode extracting layer 210 is stacked on the other end portion of the chip body 110 in which the silver paste layer 160 is stacked. That is, the negative electrode extracting layer 210 is stacked on the other end portion of the condenser element 100.

The negative electrode extracting layer 210 may be stacked by any one of the dispensing method, the dipping method, and the printing method.

Meanwhile, the negative electrode extracting layer 210 may be made of a conductive paste made of gold (Au), lead (Pb), silver (Ag), nickel (Ni), copper (Cu) having viscosity, which is applied to one surface of the condenser element 100 in order to have the sufficient strength and hardness by performing the drying, hardening, and sintering processes, or the like, in a temperature range of about 30 to 300° C.

Thereafter, as shown in FIG. 13, the molding layer 160 is stacked by the molding to dispose the chip body 110 stacked with the negative electrode extracting layer 210 therein. That is, the molding layer 260 is stacked on the mounting sheet S and is stacked at the outside of the condenser element 100 stacked with the negative electrode extracting layer 210.

The molding layer 260 may be made of an epoxy resin material including a filler having a relatively large particle.

Thereafter, as shown in FIG. 14, the dicing process cutting the chip body 110, the negative electrode extracting layer 210 and the molding layer 260 in order to expose the one end portion of the chip body 110 and the negative electrode extracting layer 210 to the outside is performed. The one end portion of the chip body 110 is cut by a dicing method using a blade or a dicing method using a laser in order to form the positive electrode terminal contact layer 120 of the condenser element 100. In addition, the negative electrode extracting layer 210 is cut to be exposed to the outside.

Thereafter, the diced surface is ground or trimmed in order to remove impurities included in the diced surface.

The positive electrode terminal 230 and the negative electrode terminal 220 are more easily stacked on the positive electrode terminal contact layer 120 and the negative electrode extracting layer 210 by grinding and trimming the positive electrode terminal contact layer 120 and the negative electrode extracting layer 210.

Figure 15:
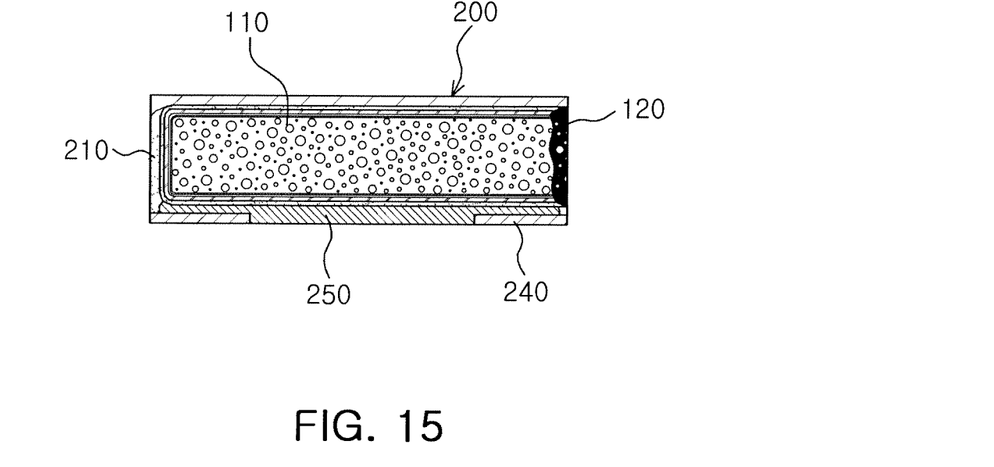

Thereafter, as shown in FIG. 15, the mounting sheet S for forming the strength reinforcing member 240 and applying the liquid sealing member 250 is removed. In this case, the mounting sheet S may be removed by thermal, chemical or mechanical methods.

Figure 16:
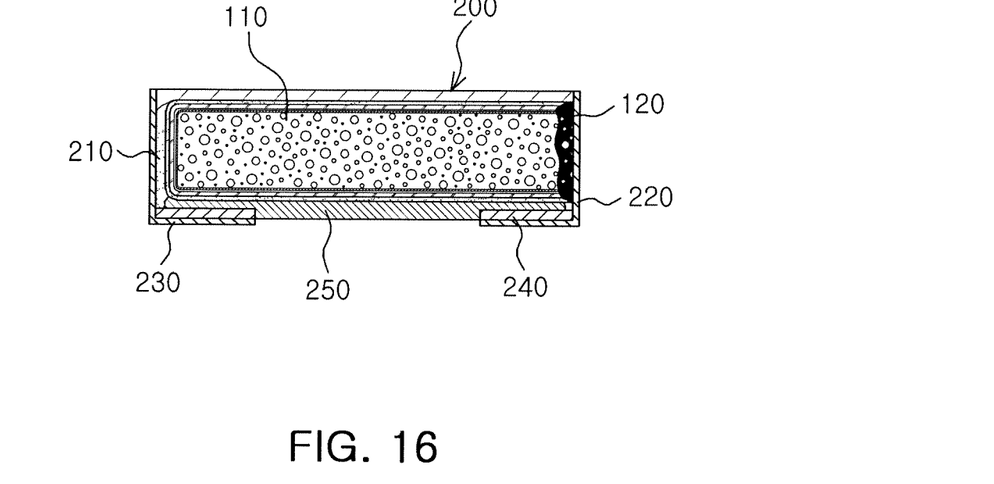

Thereafter, as shown in FIG. 16, the positive electrode terminal 230 and the negative electrode terminal 220 are formed on the bottom surfaces of the positive electrode terminal contact layer 120, the negative electrode extracting layer 210, and the strength reinforcing member 240. In this case, the positive electrode terminal 230 and the negative electrode terminal 220 may be made by the electrolysis or electroless plating and may be formed by the dipping or applying methods using paste.

As described above, the solid electrolytic capacitor 200 capable of directly extracting the positive electrode terminal from the chip body 110 by removing the positive electrode wire through the positive electrode terminal contact layer 120 may be manufactured.

Therefore, the solid electrolytic capacitor 200 capable of improving the electrical resistance characteristics while improving the volumetric efficiency of the positive electrode part can be manufactured.

In addition, the solid electrolytic capacitor 200 capable of reducing the damage of the positive electrode terminal 230 and the negative electrode terminal 220 from the external impact by using the strength reinforcing member 240 can be manufactured.

Further, the damage of the positive electrode terminal 230 and the negative electrode terminal 220 can be prevented by using the strength reinforcing member 240, such that the solid electrolytic capacitor 200 capable of improving the volumetric efficiency can be manufactured.

As set forth above, the present invention can directly extract the positive electrode terminal from the chip body by removing the positive electrode wire through the positive electrode terminal contact layer.

Therefore, the present invention can improve the volumetric efficiency of the positive electrode part while improving the electrical resistance characteristics.

Further, the present invention can reduce the damage of the positive electrode terminal and the negative electrode terminal from the external impact by using the strength reinforcing member.

In addition, the present invention can prevent the damage of the positive electrode terminal and the negative electrode terminal by using the strength reinforcing member, thereby making it possible to improve the volumetric efficiency.

Moreover, the present invention can increase the capacitance within the same volume while implementing low electrical resistance characteristics by stacking the condenser elements in parallel.

While the present invention has been shown and described in connection with the exemplary embodiments, it will be apparent to those skilled in the art that modifications and variations can be made without departing from the spirit and scope of the invention as defined by the appended claims.

What is claimed is:

1. A solid electrolytic capacitor, comprising:
   a condenser element including a chip body molded by sintering, a positive electrode terminal contact layer formed on one area of the chip body to be exposed to the outside, an insulating layer formed in the entire area or some area other than one area in which the positive electrode terminal contact layer is formed, and a negative electrode layer stacked on the insulating layer;
   a negative electrode extracting layer stacked to be electrically connected with the negative electrode layer;
   a negative electrode terminal stacked on the negative electrode extracting layer;
   a positive electrode terminal stacked on the positive electrode terminal contact layer and in direct contact with the chip body;
   a first strength reinforcing member mounted to be interposed between the negative electrode terminal and the condenser element and a second strength reinforcing member mounted to be interposed between the positive electrode terminal and the condenser element to prevent the negative electrode terminal and the positive electrode terminal from being damaged due to external impact; and
   a liquid sealing material sealing the bottom surface of the condenser element by being filled between the first and second strength reinforcing members,
   wherein the positive electrode terminal contact layer is made of a resin material, and
   wherein the resin included in the positive electrode terminal contact layer contains nanoparticles so as to be easily infiltrated into the chip body.

2. The solid electrolytic capacitor of claim 1, further comprising a molding layer stacked on a portion other than the positive electrode terminal contact layer and the negative electrode extracting layer to protect the condenser element.

3. The solid electrolytic capacitor of claim 2, wherein the negative electrode terminal and the positive electrode terminal are formed to be extended to the bottom surface of the positive electrode terminal contact layer, the negative electrode extracting layer, and the strength reinforcing member adjacent to the positive electrode terminal contact layer and the negative electrode extracting layer.

4. The solid electrolytic capacitor of claim 1, wherein the negative electrode extracting layer is formed as a dispensing type, a dipping type, or a printing type.

5. The solid electrolytic capacitor of claim 4, wherein the negative electrode extracting layer is made of a paste having viscosity including a conductive material.

6. The solid electrolytic capacitor of claim 4, wherein the negative electrode extracting layer is made of a conductive paste having viscosity including at least one of Au, Pd, Ag, Ni, and Cu.

7. The solid electrolytic capacitor of claim 1, wherein the first strength reinforcing member or the second strength reinforcing member is made of a metallic material or a synthetic resin material.

8. The solid electrolytic capacitor of claim 7, wherein the first strength reinforcing member or the second strength reinforcing member is made of a material including a metallic material of at least one of steel, Cu, and Ni.

9. The solid electrolytic capacitor of claim 7, wherein the first strength reinforcing member or the second strength reinforcing member is formed to have a thickness of 20 to 50 μm.

10. The solid electrolytic capacitor of claim 1, wherein the liquid sealing member is interposed between the bottom surface of the condenser element and the top surface of the first strength reinforcing member or the second strength reinforcing member to insulate the condenser element from the first strength reinforcing member or the second strength reinforcing member.

11. The solid electrolytic capacitor of claim 10, wherein the liquid sealing member contacts at least two surfaces of the first strength reinforcing member or the second strength reinforcing member to improve the bonding strength of the first strength reinforcing member or the second strength reinforcing member.

12. The solid electrolytic capacitor of claim 1, wherein the negative electrode terminal and the positive electrode terminal are formed by any one of an electrolysis plating method, an electroless plating method, a dipping method, and a paste applying method.

13. The solid electrolytic capacitor of claim 12, further comprising an inner plating layer made of electroless nickel-phosphorus (Ni—P) and an outer plating layer formed by plating copper (Cu) or tin (Sn) on the inner plating layer when the negative electrode terminal and the positive electrode terminal are formed by the electroless plating method.

14. The solid electrolytic capacitor of claim 1, wherein the condenser element is provided in plural to be arranged in parallel.

15. The solid electrolytic capacitor of claim 14, wherein the plurality of condenser elements are parallely arranged in a vertical direction or a horizontal direction.

\* \* \* \* \*